2,821,232
Patented Jan. 28, 1958

2,821,232

RUBBER TIRE TREAD COMPOSITION CONTAINING CARBON BLACK AND SILICA AND TIRE MADE FROM SAME

Ralph F. Wolf, Akron, Ohio, assignor to Columbia-Southern Chemical Corporation, Allegheny County, Pa., a corporation of Delaware No Drawing. Application July 8, 1954
Serial No. 442,207

7 Claims. (Cl. 152—330)

This invention relates to rubber, and more particularly to rubber compositions useful for automotive vehicle tires, tread blocks for tanks and tractors, and the like.

Carbon black is widely used as a reinforcing agent for rubber in tires and treads because of its low cost and the high tensile strength and abrasion resistance of the reinforced rubber. Automobile tires made of carbon-reinforced rubber are quite satisfactory for ordinary road use. Resistance to cutting and chipping is not satisfactory, however, so that truck tires and tractor treads which are used off paved roads (as for example in road construction, quarries, etc.) are frequently cut or chipped so that they must be discarded before there is any substantial amount of tread wear.

Silica has been used as a rubber reinforcing pigment. While the forms of finely divided silica produced by reaction of ethyl silicate and silicon tetrachloride with oxygen have rivaled carbon black in their reinforcing properties they have been too costly for extensive use. Finely divided hydrated silica, precipitated from aqueous medium is much less costly but is noticeably inferior to carbon black as a rubber reinforcing pigment.

According to this invention, it has been found that, notwithstanding the relatively inferior properties of such precipitated silica, it is possible to produce silica-rubber compositions which are as strong as or even superior to carbon black reinforced rubber. This may be effected by mixing unvulcanized rubber with carbon black and a precipitated silica such as of the type hereinafter described and vulcanizing the product. Such rubber has greater resistance to cutting and chipping than rubber reinforced with carbon black alone while having the high tensile strength, toughness and abrasion resistance characteristic of carbon black-reinforced rubber.

Soft rubber stocks of either normal or higher hardness can be prepared according to the present invention. Rubber stocks prepared according to this invention exhibit a knotty tear; that is, an attempt to extend a cut or tear in the original direction of tear results only in a short transverse tear. Stocks compounded with carbon black alone, on the other hand, may be torn relatively easily in substantially a straight line. Because of their knotty tear, soft rubber stocks of normal hardness compounded according to the present invention are particularly valuable in tires used off the road where cutting and chipping are frequent.

Stocks compounded according to the present invention which are of higher hardness than tire stocks are useful in making tread blocks for continuous treads such as tank and tractor treads. Tread blocks compounded according to the present invention are superior in cutting and chipping resistance to tread blocks reinforced with carbon black alone.

Rubber compounded according to the present invention contains a reinforcing quantity of carbon black and the silica herein contemplated in which the amount of the silica constitutes about 15 to about 60 percent of the total weight of silica and carbon. The total weight of carbon black and silica in rubber according to the present invention ranges from about 20 to about 90 parts by weight per 100 parts of rubber, the amount of reinforcing material being greater in the harder rubbers. For instance, tires compounded according to the present invention generally contain about 45 to about 60 parts by weight of carbon black plus silica, while tank tread blocks contain larger pigment loadings, i. e., approximately 70 to 80 or more parts by weight of carbon black plus silica per 100 parts of rubber. The amount of silica should be at least 10 parts by weight per 100 of rubber. Thus the minimum amount of silica is 15 percent of the combined weight of carbon black and silica or 10 percent of the weight of rubber, whichever is greater. In compounding rubber stocks according to the present invention, it is convenient to substitute approximately equal volumes of silica for carbon black in conventional formulas.

The preferred rubber stocks according to the present invention are those which when compounded have a high abrasion resistance. Notable among these are natural rubber and butadiene-styrene copolymers such as GR–S, a copolymer containing 75 percent butadiene-1,3 and 25 percent styrene by weight. Other synthetic rubber stocks which are polymers and copolymers of conjugated diolefins having a high abrasion resistance when compounded are also usable according to the present invention.

The silica incorporated in rubber according to the present invention should have an average ultimate particle size in the range of 0.01 to 0.05 micron as determined by the electron microscope. Best results are obtained using silicas having a surface area of about 50 to 225 square meters per gram, as measured by the Brunauer-Emmett-Teller method, described in the Journal of the American Chemical Society, volume 60, page 309 (1938). Silica having a surface area in the range of 125 to 200 square meters per gram has been found to yield optimum properties.

Silica for use according to the present invention may be made by various methods, such as those described in the copending application of Fred S. Thornhill and Edward M. Allen, Serial No. 374,292, filed August 14, 1953, and particularly according to Example I herein. Such silica is a hydrated product containing 2 to 10 percent by weight of free water (water which can be driven off by heating for 24 hours at 105° C.) and 4 to 10 percent by weight of bound water (water which is driven off by heating to constant weight at 1000° C. minus the free water).

Any carbon black which is suitable for reinforcement of rubber, notably blacks giving high abrasion, may be used in compositions according to the present invention. Various methods of producing such reinforcing carbon blacks are known in the art.

The ingredients of rubber compositions according to the present invention may be incorporated in the rubber stock by milling as for example in a Banbury mixer. In addition to carbon black and silica, rubber compositions according to the present invention include conventional compounding ingredients, i. e., accelerators, accelerator activators, antioxidants, etc. Suitable compounding ingredients for these purposes are known. In a preferred mode of operation, sulphur is incorporated in a mill after the pigments and other ingredients have been thoroughly mixed into the rubber.

The following examples are illustrative of the present invention:

EXAMPLE I

Vulcanizates of natural rubber containing both carbon black and silica were prepared as described below. Silica in these vulcanizates is prepared according to the following procedure:

Seventeen thousand gallons of a sodium silicate solution $Na_2O(SiO_2)_{3.36}$ containing 20.3 grams of $Na_2O$ per liter is placed in a 50,000-gallon tank. This solution contains no sodium chloride except that minor amount (less than 0.08 percent) usually present in commercial sodium silicate. The solution is held at a temperature of 167° F. plus or minus 5° F. Carbon dioxide gas containing 10.0 to 10.8 percent of $CO_2$, the balance being nitrogen and air, is introduced into the solution at a gas temperature of 115° F. to 145° F. at a rate sufficient to provide 1,250 cubic feet of the carbon dioxide gas per minute (measured at 760 millimeters pressure and 0° C.). This gas is introduced directly under a turbo agitator near the bottom of the tank in a manner to achieve uniform distribution of gas and the mixture is vigorously agitated. Carbon dioxide introduction is continued at this rate for 8½ hours, at which time about 120 to 140 percent of the theoretical amount of $CO_2$ necessary to convert the $Na_2O$ in solution to $Na_2CO_3$ has been introduced. After this period of 8½ hours, the rate of introduction of carbon dioxide is reduced to 400 cubic feet per minute and the solution is boiled for 1½ hours by introduction of steam at 140 pounds per square inch directly into the slurry. The slurry is then washed and the silica is recovered and dried at 100° C. to 125° C. The silica has a surface area of 140 to 150 square meters per gram and an average ultimate particle size of 0.02 to 0.05 micron.

Three samples of natural rubber were compounded according to the formulas below, using silica prepared as described in the preceding paragraph and high abrasion furnace (HAF) carbon black. The compounding formulas, in which the numbers represent parts by weight, were as follows:

|  | A | B | C |
| --- | --- | --- | --- |
| Natural Rubber (smoked sheets) | 100 | 100 | 100 |
| Silica |  | 21.6 | 58.5 |
| HAF Carbon Black (Philblack O) | 50 | 30 |  |
| Zinc Oxide | 5 | 5 | 5 |
| Sulfur | 2.5 | 2.5 | 3 |
| Phenyl beta-naphthylamine | 1 | 1 |  |
| Flexamine (65% diarylamineketone reaction product plus 35% N,N'diphenyl-p-phenylene diamine) | 1 | 1 |  |
| Santocure (Benzothiazyl-2-monocyclohexyl sulfenamide) | 0.5 | 0.62 | 1 |
| Di-ortho tolyl guanidine |  | 0.48 | 1.2 |
| Triethanolamine |  | 0.2 | 0.5 |
| Paraflux 2016 (asphaltic flux type softener) | 3 | 3 |  |
| Stearic Acid | 3 | 3 | 3 |
| Benzothiazyl disulfide |  |  | 0.8 |

Test results of the above samples are as follows:

*Table I*

| Sample | Minutes Cure at 287° F. | Modulus 300% | Tensile, lbs./sq. in. | Elongation, Percent | Durometer Hardness | Machine Tear, lbs./in. | Hand Tear |
| --- | --- | --- | --- | --- | --- | --- | --- |
| A | 15 | 1,330 | 3,080 | 520 | 56 | 560 | Smooth. |
|   | 30 | 2,070 | 4,010 | 510 | 66 | 750 | Do. |
|   | 45 | 2,270 | 4,010 | 480 | 66 | 830 | Do. |
|   | 60 | 2,240 | 3,840 | 470 | 63 | 820 | Do. |
| B | 15 | 1,570 | 3,830 | 560 | 58 | 860 | Knotty. |
|   | 30 | 1,900 | 3,840 | 500 | 63 | 760 | Do. |
|   | 45 | 1,970 | 3,930 | 510 | 63 | 780 | Do. |
|   | 45 | 1,970 | 3,930 | 510 | 63 | 780 | Do. |
|   | 60 | 1,900 | 3,790 | 500 | 62 | 670 | Do. |
| C | 15 | 1,350 | 3,230 | 550 | 81 | 770 | Very Knotty. |
|   | 30 | 1,460 | 3,050 | 500 | 86 | 700 | Do. |
|   | 45 | 1,400 | 3,010 | 520 | 88 | 690 | Do. |
|   | 60 | 1,450 | 2,940 | 500 | 88 | 650 | Do. |

A pair of size 8.00-15 test tires, each having one section of tread made of rubber of the composition of Sample A and another section of the composition of Sample B, were prepared. This construction permits two samples to be tested under identical conditions of inflation, load, temperature, and road surface.

The tires were run at 26 pounds pressure and 1380 pounds load on each tire for 13,594 miles. After this road test, the depth of the tread groove was measured in the center or crown of each tire and the number of miles traveled for each 0.001 inch loss in tread depth was calculated. A third tire having a tread made of rubber stock of the composition of Sample C was run 13,698 miles on the road at 26 pounds pressure and 1380 pounds load. Results of the test are as follows:

*Table II*

| Tire | Tread Composition (Sample letter) | Miles per .001 inch tread loss |
| --- | --- | --- |
| 1 | A (carbon only) | 117.2 |
|   | B (carbon plus silica) | 118.2 |
| 2 | A (carbon only) | 108.8 |
|   | B (carbon plus silica) | 113.3 |
| 3 | C (silica only) | 68.1 |

As may be seen, tire treads compounded with both carbon black and silica have a surprisingly good abrasion resistance which cannot be predicted from the abrasion resistances of tread stocks compounded entirely with carbon black or silica. In fact, the formulations containing both carbon black and silica reported in the above table have superior abrasion resistance to formulations compounded with either reinforcing agent alone.

EXAMPLE II

Two samples of natural rubber were compounded with super abrasion furnace (SAF) carbon black according to the formulas below. One of the samples contained carbon black alone as a reinforcing agent and the other contained both carbon black and silica prepared as described in Example I. The compounding formulas, in which the numbers represent parts by weight, were as follows:

|  | D | E |
| --- | --- | --- |
| Natural Rubber (smoked sheets) | 100 | 100 |
| Silica |  | 10.8 |
| SAF Carbon Black (Philblack E) | 45 | 35 |
| Zinc Oxide | 5 | 5 |
| Sulfur | 2.5 | 2.5 |
| Phenyl beta-naphthylamine | 1 | 1 |
| Flexamine (65% diarylamineketone reaction product plus 35% N, N' diphenyl-p-phenylene diamine) | 1 | 1 |
| Santocure (Benzothiazyl-2-monocyclohexyl sulfenamide) | 0.45 | 0.49 |
| Di-ortho tolyl guanidine |  | 0.21 |
| Triethanolamine |  | 0.18 |
| Paraflux 2016 (asphaltic flux type softener) | 6 | 6 |
| Stearic Acid | 3 | 3 |
| Benzothiazyl disulfide |  |  |

The above formulations were tested with the results indicated in Table III below:

Table III

| Sample | Minutes Cure at 287° F. | Modulus 300% | Tensile | Elongation | Durometer Hardness | Machine Tear, lbs./in. | Hand Tear |
|---|---|---|---|---|---|---|---|
| D | 15 | 530 | 2,520 | 630 | 57 | 340 | Smooth. |
|   | 30 | 1,050 | 4,070 | 630 | 62 | 880 | Do. |
|   | 45 | 1,320 | 4,300 | 610 | 63 | 970 | Do. |
|   | 60 | 1,460 | 3,900 | 580 | 66 | 900 | Do. |
| E | 15 | 770 | 3,570 | 660 | 57 | 620 | Knotty. |
|   | 30 | 1,280 | 4,080 | 620 | 62 | 880 | Do. |
|   | 45 | 1,380 | 4,160 | 610 | 62 | 820 | Do. |
|   | 60 | 1,400 | 4,040 | 590 | 66 | 760 | Do. |

A pair of size 8.00-15 test tires, each having one tread section of the composition of Sample D and another tread section of the composition of Sample E were prepared. The tires were run at 26 pounds pressure and 1380 pounds load. Tire 4 was run 13,214 miles and tire 5 was run 12,679 miles. The depth of the tread grooves was measured at the center or crown of each tire and the number of miles per .001 inch loss of tread depth was calculated. The results of the road test are indicated in Table IV below:

Table IV

| Tire | Tread Composition (Sample letter) | Miles per .001 inch tread loss |
|---|---|---|
| 4 | D (carbon only) | 109.2 |
|   | E (carbon plus silica) | 104.1 |
| 5 | D (carbon only) | 95.8 |
|   | E (carbon plus silica) | 105.7 |

Comparison of the loss in tread depth of tire 5 with the loss in tires 3 (see Example I) and 4 shows that tires reinforced with both carbon black and silica have an unexpectedly high abrasion resistance which cannot be predicted from the abrasion resistances of rubber compounded with either carbon black or silica alone. Furthermore rubbers reinforced with both carbon black and silica have knotty tear instead of the smooth tear characteristic of rubbers reinforced with carbon black alone.

EXAMPLE III

A sample of GR-S-1500, which is a copolymer of 75 percent butadiene-1,3 and 25 percent styrene by weight, was compounded with silica prepared as described in Example I and super abrasion furnace (SAF) carbon black. For comparison, control samples (one of which was compounded with carbon black as the only reinforcing pigment and the other of which was compounded with silica as the only reinforcing pigment) were also prepared. The composition of each sample in parts by weight is given in Table V below:

Table V

|  | F | G | H |
|---|---|---|---|
| GR-S-1500 | 100 | 100 | 100 |
| SAF Carbon black | 60 | 50 | 40 |
| Silica | 0 | 10.8 | 21.6 |
| Zinc oxide | 3 | 3 | 3 |
| Sulphur | 1.75 | 2.05 | 2.35 |
| N-cyclohexyl-2-benzothiazole sulfenamide | 1.25 | 1.25 | 1.25 |
| Diorthotholylguanidine | 0 | 0.3 | 0.6 |
| Diarylamine-ketone reaction product | 0.65 | 0.65 | 0.65 |
| N,N'diphenyl-t-phenylene diamine | 0.35 | 0.35 | 0.35 |
| Triethanolamine | 0 | 0.25 | 0.5 |
| Coumarone-indene resin (melting point 100° C.) | 0 | 2 | 4 |
| Aliphatic hydrocarbon oil (boiling point (10 mm. Engler) initial 335° F., final 536° F., viscosity 107 S. U. S. at 100° F., 39.6 at 210° F.) | 5 | 5 | 5 |
| Stearic acid | 1.5 | 1.5 | 1.5 |

Results of the test on these samples are given in Table VI below:

Table VI

| Sample | Minutes Cure at 315° F. | Modulus 300%, lb./in.² | Tensile, lb./in.² | Elongation, Percent | Durometer Hardness | Machine Tear, lbs./in. | Hand Tear |
|---|---|---|---|---|---|---|---|
| F | 15 | 1,380 | 3,260 | 570 | 72 | 400 | Smooth, Poorer than G or H. |
|   | 20 | 1,900 | 3,870 | 520 | 74 | 360 |  |
|   | 25 | 2,080 | 4,080 | 500 | 75 | 350 |  |
|   | 30 | 2,240 | 3,990 | 460 | 74 | 320 |  |
|   | 35 | 2,310 | 3,080 | 460 | 76 | 340 |  |
| G | 15 | 1,160 | 3,490 | 610 | 70 | 380 | Knotty, Better than F. |
|   | 20 | 1,500 | 3,700 | 540 | 73 | 380 |  |
|   | 25 | 1,760 | 3,860 | 510 | 75 | 330 |  |
|   | 30 | 1,820 | 3,870 | 500 | 74 | 330 |  |
|   | 35 | 1,860 | 3,730 | 490 | 73 | 210 |  |
| H | 15 | 1,290 | 3,360 | 550 | 72 | 350 | Do. |
|   | 20 | 1,490 | 3,310 | 470 | 74 | 290 |  |
|   | 25 | 1,700 | 3,300 | 460 | 73 | 300 |  |
|   | 30 | 1,650 | 3,420 | 470 | 73 | 330 |  |
|   | 35 | 1,690 | 3,230 | 440 | 74 | 280 |  |

Knotty hand tear in samples compounded as described in this example is indicative of good resistance to cutting and chipping, while smooth hand tear indicates poor resistance to cutting and chipping. The foregoing table therefore indicates greater cutting and chipping resistance in Samples G and H, which were prepared according to the present invention than in Sample F, which was reinforced with carbon black alone. Furthermore, the tensile strength of Sample G is comparable to that of Sample F, and that of Sample H is only slightly poorer.

Samples having the compositions denoted by F, G and H above and cured for 25 minutes were tested for heat buildup and flex resistance. The samples were subjected to 18,000 flexes according to the De Mattia flex test (A. S. T. M. Test D813-52T) and the growth of a cut in the test specimen in inches was recorded. Heat buildup was measured on a Goodrich flexometer according to A. S. T. M. Test D623-52T with a stroke of 0.175 inches and a load of 29.5 pounds and the temperature rise in degrees F. above the initial temperature was recorded.

| Sample | Heat Build-up, °F. | Flex, Inches After 18,000 Flexes |
|---|---|---|
| F | 195 | 0.66 |
| G | 161 | 0.15 |
| H | 154 | 0.99 |

While the foregoing invention has been described with reference to illustrative embodiments thereof, the details given herein shall not be regarded as limiting the invention except insofar as they are included in the appended claims.

I claim:

1. A vulcanized rubber composition comprising natural rubber and a reinforcing quantity of a mixture of carbon black and finely divided precipitated hydrated silica having an average ultimate particle size in the range of 0.02 to 0.05 micron and a surface area in the range of 50 to 200 square meters per gram and constituting 15 to 60 percent of the combined weight of the carbon black and silica and at least 10 percent of the weight of rubber.

2. A vulcanized rubber composition comprising a rubbery material selected from the group consisting of natural rubber and polymers of conjugated diolefins, carbon black, and finely divided hydrated silica having an average ultimate particle size in the range of 0.02 to 0.05 micron and a surface area in the range of 50 to 225 square meters per gram, the combined weight of carbon black and silica being in the range of approximately 20 to 90 percent of the weight of the rubber, the amount of silica ranging from about 15 to about 60 percent of the combined weight of carbon black and silica.

3. A vulcanized rubber composition comprising natural rubber, carbon black and finely divided hydrated silica, having an average ultimate particle size in the range of 0.02 to 0.05 micron and a surface area in the range of 125 to 200 square meters per gram, the combined weight of carbon black and silica being in the range of approximately 20 to 90 percent of the weight of the rubber, the amount of silica ranging from about 15 to about 60 percent of the combined weight of carbon black and silica.

4. A vulcanized rubber composition comprising natural rubber and a reinforcing quantity of a mixture of carbon black and finely divided precipitated hydrated silica having an average ultimate particle size in the range of 0.02 to 0.05 micron and a surface area in the range of 50 to 200 square meters per gram, the silica constituting 15 to 60 percent of the combined weight of the carbon black and silica and at least 10 percent of the weight of the rubber, and containing 2 to 10 percent by weight of free water and 4 to 10 percent by weight of bound water.

5. A tire having a vulcanized rubber tread comprising natural rubber, carbon black and finely divided precipitated hydrated silica having an average ultimate particle size in the range of 0.02 to 0.05 micron and a surface area in the range of 50 to 200 square meters per gram, the combined weight of carbon black and silica ranging from 45 to 60 percent of the weight of rubber, the amount of silica present being at least 10 percent of the weight of the rubber.

6. A tire having a vulcanized rubber composition tread comprising natural rubber, carbon black and finely divided hydrated silica having an average ultimate particle size in the range of 0.02 to 0.05 micron and a surface area in the range of 125 to 200 square meters per gram, the combined weight of carbon black and silica being in the range of approximately 45 to 60 percent of the weight of the rubber, the amount of silica present being at least 10 percent of the weight of the rubber.

7. A vulcanized rubber composition comprising a rubbery butadiene-styrene copolymer and a reinforcing quantity of a mixture of carbon black and finely-divided, precipitated, hydrated silica having an average ultimate particle size in the range of 0.02 to 0.05 micron and a surface area in the range of 50 to 200 square meters per gram and constituting 15 to 60 percent of the combined weight of the carbon black and silica and at least 10 percent of the weight of the rubber copolymer.

References Cited in the file of this patent

UNITED STATES PATENTS

| | | |
|---|---|---|
| 2,428,252 | Von Stroh | Sept. 30, 1947 |
| 2,502,949 | Howlett et al. | Apr. 4, 1950 |
| 2,597,872 | Iler | May 27, 1952 |